US008807168B2

(12) United States Patent
Lovell

(10) Patent No.: US 8,807,168 B2
(45) Date of Patent: Aug. 19, 2014

(54) VOLUME BOOSTER WITH SEAT LOAD BIAS

(75) Inventor: Michel K. Lovell, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 459 days.

(21) Appl. No.: 13/278,368

(22) Filed: Oct. 21, 2011

(65) Prior Publication Data

US 2012/0085437 A1   Apr. 12, 2012

Related U.S. Application Data

(63) Continuation-in-part of application No. 12/901,018, filed on Oct. 8, 2010, now Pat. No. 8,689,832.

(51) Int. Cl.
| F15B 13/042 | (2006.01) |
| F16K 11/04 | (2006.01) |
| F16K 47/08 | (2006.01) |
| F15B 13/043 | (2006.01) |
| F15B 13/04 | (2006.01) |

(52) U.S. Cl.
CPC ............. *F15B 13/0405* (2013.01); *F16K 11/04* (2013.01); *F16K 47/08* (2013.01); *F15B 13/0433* (2013.01)
USPC ............ 137/625.66; 137/596.14; 137/625.28; 91/463

(58) Field of Classification Search
USPC ............ 137/625.66, 596.14, 625.28, 625.37; 91/450, 463, 465; 251/50, 53, 55
See application file for complete search history.

(56) References Cited

U.S. PATENT DOCUMENTS

| 750,331 | A | 1/1904 | Ackley |
| 3,693,659 | A | 9/1972 | Parola |
| 3,800,817 | A | 4/1974 | Gropp et al. |
| 4,505,865 | A | 3/1985 | Wullenkord |
| 4,617,963 | A | 10/1986 | Stares |
| 7,458,310 | B2 | 12/2008 | Junk |

(Continued)

FOREIGN PATENT DOCUMENTS

| DE | 33 04 523 A1 | 8/1984 |
| DE | 202 11 249 U1 | 12/2003 |

(Continued)

OTHER PUBLICATIONS

"Fairchild Model 4800A Pneumatic Volume Booster: Installation, Operation and Maintenance Instructions", Mar. 2010.

(Continued)

*Primary Examiner* — Craig Schneider
(74) *Attorney, Agent, or Firm* — Marshall, Gerstein & Borun LLP

(57) ABSTRACT

A fluid flow control device includes a trim cartridge, a diaphragm assembly, and a control element. The trim cartridge defines a cartridge supply port and an upper planar surface. The cartridge supply port is disposed along a supply path of the volume booster and the upper planar surface is disposed along an exhaust of the volume booster. The diaphragm assembly defines an exhaust port on the exhaust path. The control element is movably disposed in the trim cartridge and includes a supply plug, an exhaust plug, and a stem. The supply plug engages the cartridge supply port and the exhaust plug engages the exhaust port. The exhaust plug further includes a lower planar surface that is coplanar with the upper planar surface of the trim cartridge.

26 Claims, 6 Drawing Sheets

(56) References Cited

U.S. PATENT DOCUMENTS

| | | | |
|---|---|---|---|
| 7,845,268 | B2 | 12/2010 | Junk |
| 8,631,826 | B2 * | 1/2014 | Lovell et al. ............. 137/625.66 |
| 8,689,832 | B2 * | 4/2014 | Lovell ..................... 137/625.66 |
| 2004/0182074 | A1 | 9/2004 | Steinke et al. |
| 2005/0029416 | A1 | 2/2005 | Buck et al. |
| 2005/0211321 | A1 | 9/2005 | Bush et al. |
| 2005/0229775 | A1 | 10/2005 | Junk |
| 2007/0240774 | A1 | 10/2007 | McCarty |
| 2009/0272442 | A1 | 11/2009 | Fishwick |
| 2009/0283160 | A1 | 11/2009 | Fishwick et al. |
| 2010/0207045 | A1 | 8/2010 | Koch et al. |

FOREIGN PATENT DOCUMENTS

| | | | |
|---|---|---|---|
| WO | WO-2004/072475 | A2 | 8/2004 |
| WO | WO-2005/103542 | A1 | 11/2005 |
| WO | WO-2005/106256 | A1 | 11/2005 |

OTHER PUBLICATIONS

"Valve Positioners and Volume Boosters, Series 61 Booster Relays, Introduction," understood to be publicly available at least as early as Sep. 14, 2010, 3 pages.

ControlAir Inc., "Type 6000 Volume Booster: High Flow Capacity in a Rugged Casing," Retrieved from the Internet on Jul. 20, 2010, 4 pages. Available at URL: <http://www.controlair.com/boost_relay/6000boost.html>, Feb. 9, 2010.

Fairchild Industrial Products Company, "Pneumatic Volume Booster, Model 200", 6 pages, Oct. 2000.

Fairchild Industrial Products Company, Pneumatic Volume Booster, Model 4500A, 4 pages, Jan. 2001.

Fairchild Industrial Products Company, Pneumatic Volume Booster, Model 200XLR, 6 pages, Oct. 2000.

Young Tech co., Ltd., "Volume Booster Relays: YT-310, YT-315: User's Manual", 9 pages, Jun. 2007.

Office Action for U.S. Appl. No. 12/901,018, dated Jul. 12, 2013.

International Preliminary Report on Patentability for Application No. PCT/US2011/051406, dated Mar. 19, 2013.

International Preliminary Report on Patentability for Application No. PCT/US2011/051412, dated Mar. 19, 2013.

International Search Report and Written Opinion for Application No. PCT/US2011/051406, dated Dec. 28, 2011.

International Search Report and Written Opinion for Application No. PCT/US2011/051412, dated Feb. 10, 2012.

International Search Report for Application No. PCT/US2012/061285, dated Mar. 8, 2013.

Partial International Search Report for Application No. PCT/US2011/051412, dated Dec. 28, 2011.

International Preliminary Report on Patentability for Application No. PCT/US2012/061285, dated Apr. 22, 2014.

* cited by examiner

VOLUME BOOSTER WITH SEAT LOAD BIAS

CROSS-REFERENCE TO RELATED APPLICATIONS

This is a continuation-in-part of U.S. patent application Ser. No. 12/901,018, filed Oct. 8, 2010, the entire contents of which are incorporated herein by reference.

FIELD OF THE DISCLOSURE

The present disclosure is directed to volume boosters and pneumatic systems including volume boosters.

BACKGROUND

Systems for controlling the flow of fluids, such as compressed air, natural gas, oil, propane, or the like, are generally known in the art. These systems often include at least one control valve for controlling various flow parameters of the fluid. Typical control valves include a valve control element such as a valve plug, for example, movably disposed within the flow path for controlling the flow of the fluid. The position of such a control element can be controlled by a positioner via a pneumatic actuator such as a piston actuator or a diaphragm-based actuator, as is known in the art. Conventional positioners deliver pneumatic signals to the actuator to stroke the valve control element between an open and a closed position, for example. The speed at which a standard positioner can stroke the control valve, however, partly depends on the sizes of the actuator and the control valve. For example, larger actuators/control valves typically take longer to be stroked.

Therefore, such systems additionally employ one or more volume boosters located between the positioner and the actuator. For single-acting valves, a single volume booster is typically employed. For double-acting valves, two volume boosters are employed, one for each side of the actuator control element (i.e. piston or diaphragm) coupled to the valve. The volume boosters are used to amplify the volume of the pneumatic signal sent from the positioner, thereby increasing the speed at which the actuator strokes the control valve.

SUMMARY

One aspect of the present disclosure a fluid flow control device including a supply port, an output port, a vent port, a trim cartridge, a diaphragm assembly, and a control element. The supply port is for receiving a supply of pressurized fluid. The output port is for delivering a supply of pressurized fluid. The vent port is for venting a supply of pressurized fluid. The trim cartridge is disposed between the supply port and the output port and between the output port and the vent port. The trim cartridge defines a cartridge supply port and an upper planar surface. The cartridge supply port is disposed along a supply path extending between the supply port and the output port. The upper planar surface is disposed along an exhaust path extending between the output port and the vent port. The diaphragm assembly is disposed between the output port and the vent port, and defines an exhaust port along the exhaust path. The control element is movably disposed in the trim cartridge and includes a supply plug, an exhaust plug, and a stem extending between the supply and exhaust plugs. The supply plug is in selective engagement with the cartridge supply port of the trim cartridge, thereby closing the supply path. The exhaust plug is in selective engagement with the exhaust port of the diaphragm assembly, thereby closing the exhaust path. The exhaust plug comprises a lower planar surface disposed at an interface between the exhaust plug and the stem. The lower planar surface of the exhaust plug is coplanar with the upper planar surface of the trim cartridge.

Another aspect of the present disclosure provides for a fluid flow control device including a body, a diaphragm housing, a spring cap, a supply path, an exhaust path, a trim cartridge, a diaphragm assembly and a control element. The body defines a supply port adapted to be coupled to at least one supply of pressurized air and an output port adapted to be coupled to an actuator of a control valve. The diaphragm housing is coupled to the body and defines a vent port adapted to be in communication with a surrounding atmosphere. The spring cap is coupled to the diaphragm housing and defines a control signal port adapted to receive a pneumatic control signal. The supply path extends between the supply and output ports of the body. The exhaust path extends between the output port of the body and the vent port of the diaphragm housing. The trim cartridge is disposed within the body and defines a cartridge supply port and an upper planar surface. The cartridge supply port is disposed along the supply path between the supply and output ports of the body. The upper planar surface is disposed along the exhaust path between the output port of the body and the vent port of the diaphragm housing. The diaphragm assembly is disposed within the diaphragm housing and defines an exhaust port disposed along the exhaust path between the output port of the body and the vent port of the diaphragm housing.

The control element is disposed within the body and includes a supply plug, an exhaust plug, and a stem extending between the supply and exhaust plugs, the exhaust plug comprising a lower planar surface at an interface between the exhaust plug and the stem. The control element and the diaphragm assembly are movable in the body and the diaphragm housing, respectively, relative to a quiescent position, wherein a supply port seat load urges the supply plug into engagement with the cartridge supply port and an exhaust port seat load simultaneously urges the exhaust port of the diaphragm assembly into engagement with the exhaust plug of the control element to close the exhaust path. The upper planar surface of the trim cartridge is aligned with the lower planar surface of the exhaust plug when the control element and the diaphragm assembly occupy the quiescent position.

Another aspect of the present disclosure includes a fluid process control system having a control valve, an actuator, a primary source of pressurized fluid, a secondary source of pressurized fluid, first and second volume boosters, and a positioner. The actuator is operably connected to the control valve and includes a piston, a first control port in fluid communication with a first surface of the piston, and a second control port in fluid communication with a second surface of the piston. The primary source of pressurized fluid is for actuating the actuator during a normal operating mode. The secondary source of pressurized fluid is for actuating the actuator during a trip mode. The first volume booster is connected in fluid communication with the first control port of the actuator and the primary source of pressurized fluid. The first volume booster is adapted to boost a volume of pressurized fluid delivered to the first control port from the primary source of pressurized fluid during the normal operating mode. The second volume booster is connected in fluid communication with the second control port of the actuator, the primary source of pressurized fluid, and the secondary source of pressurized fluid. The second volume booster is adapted to boost the volume of pressurized fluid delivered to the second control port from the primary source of pressurized fluid during the normal operating mode and the secondary source of pressurized fluid during the trip mode. The positioner has an inlet port in fluid communication with the primary source of pressurized fluid, a first outlet port in fluid communication with an inlet connection of the first volume booster, and a second outlet port in fluid communication with an inlet connection of the second volume booster. The positioner is adapted to deliver a pneumatic signal to the first and second volume boosters during the normal operating mode of the system for controlling the control valve.

Each of the first and second volume boosters includes a supply port, an output port, a vent port, a trim cartridge, a diaphragm assembly, and a control element. The trim cartridge defines a cartridge supply port and an upper planar surface. The cartridge supply port is disposed along a supply path of the volume booster which extends between the supply port and the output port. The upper planar surface is disposed along an exhaust path of the volume booster which extends between the output port and the vent port. The diaphragm assembly defines an exhaust port disposed along the exhaust path between the output port and the vent port. The control element is movably disposed within the trim cartridge and includes a supply plug for selectively engaging the cartridge supply port of the trim cartridge, an exhaust plug for selectively engaging the exhaust port of the diaphragm assembly, and a stem extending between the supply and exhaust plugs. The exhaust plug includes a lower planar surface at an interface between the exhaust plug and the stem. The lower planar surface is disposed in alignment with the upper planar surface of the trim cartridge when the supply plug and the exhaust plug simultaneously engage the cartridge supply port and the exhaust port, respectively.

DETAILED DESCRIPTION

Figure 1:
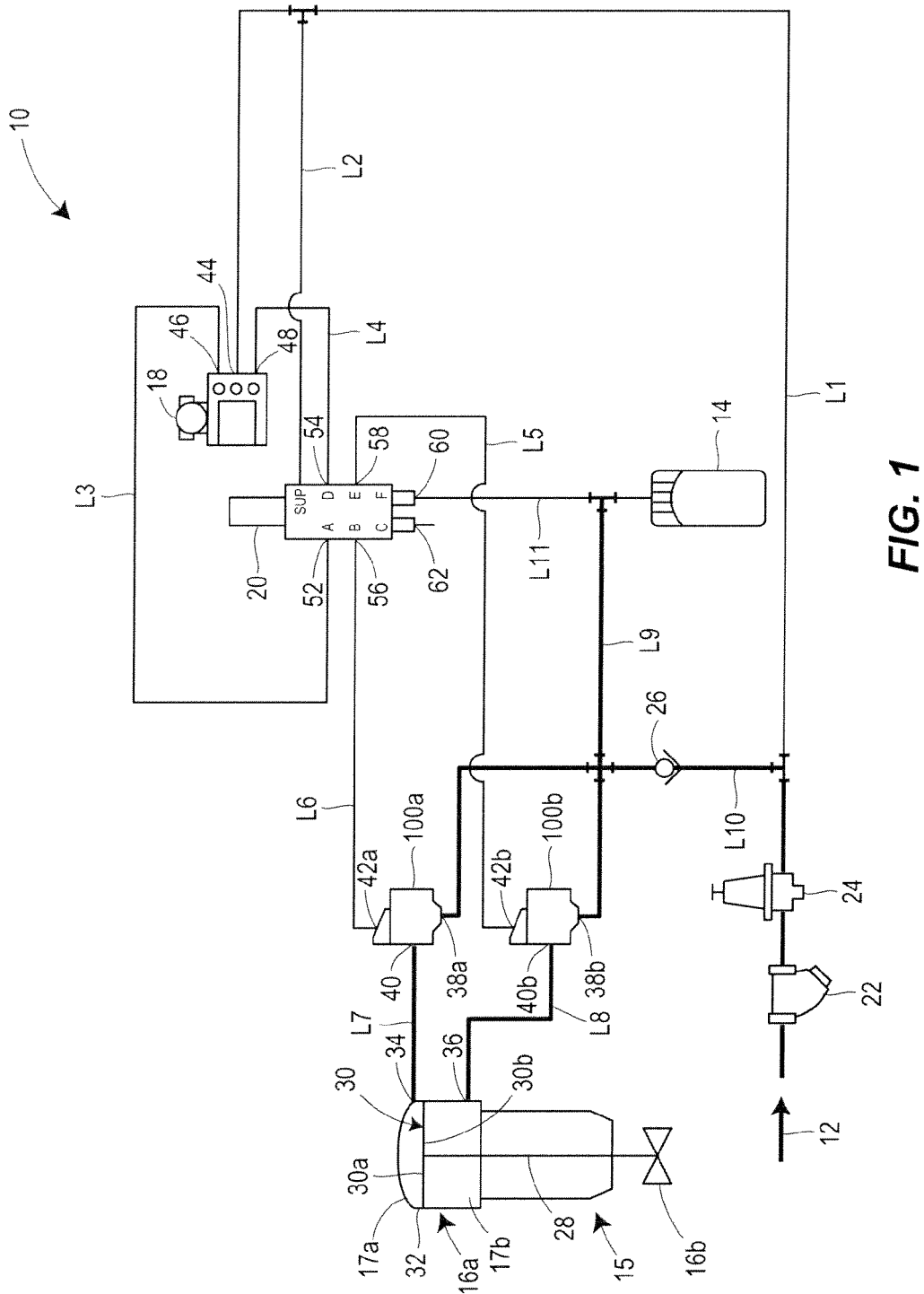
FIG. 1 is a schematic diagram of a fluid control system constructed in accordance with the principles of the present disclosure.

FIG. 1 depicts a fluid process control system 10 constructed in accordance with the principles of the present disclosure. The system 10 includes a primary source of pressurized fluid 12, a secondary source of pressurized fluid 14, a control valve assembly 15 comprising an actuator 16a coupled to a valve 16b and having an upper actuator chamber 17a and an lower actuator chamber 17b, first and second volume boosters 100a, 100b, a positioner 18, and a trip valve 20. As also shown in FIG. 1, the present version of the system 10 includes a filter 22 and a pressure regulator 24. The system 10 includes a number of delivery lines L1-L11 for delivering fluid to the various components and a check valve 26, which is operable to switch the system from a normal operating mode and a trip mode, as will be explained in further detail below.

The primary source of pressurized fluid 12 can include a supply of shop air, for example. The filter 22 serves to filter out any large particles that may be carried by the shop air, and the regulator 24 ensures that the shop air is delivered to the remainder of the system 10 under generally constant pressure. The secondary source of pressurized fluid 14 includes a volume tank, which stores a fixed volume of pressurized fluid for actuating the control valve actuator 16a into a desired position when the pressure of the primary source of pressurized fluid 12 drops below some predetermined threshold pressure and the system 10 switches into a trip mode.

The control valve actuator 16a of the present version of the disclosure includes an actuator stem 28, as is generally known. The actuator 16a is operably connected to the control valve 16b via the actuator stem 28 and includes a piston 30 operably coupled to the actuator stem 28. A housing 32 of the actuator 16a includes a first control port 34 in fluid communication with a first surface 30a of the piston 30 via the upper actuator chamber 17a, and a second control port 36 in fluid communication with a second surface 30b of the piston 30 via the lower actuator chamber 17b. In the disclosed version, the first and second surfaces 30a, 30b of the piston 30 are top and bottom surfaces of the piston 30, respectively. It should be appreciated that in other versions, the first surface 30a of the piston 30 and the first control port 34 could be on the bottom and the second surface 30b and the second control port 36 could be on the top.

Each of the first and second volume boosters 100a, 100b includes a supply port 38a, 38b, an output port 40a, 40b, and an control signal port 42a, 42b, as shown in FIG. 1. The output port 40a of the first volume booster 100a is connected in fluid communication with the first control port 34 of the actuator 16a via fluid line L7. The supply port 38a of the first volume booster 100a is in fluid communication with the primary source of pressurized fluid 12 via fluid line L10. The control signal port 42a of the first volume booster 100a is in fluid communication with the positioner 18 via fluid line L6, the trip valve 20, and fluid line L3. So configured, during a normal operating mode, the first volume booster 100a is adapted to boost (i.e., increase) the volume of pressurized fluid delivered to the first control port 34 of the actuator 16a from the primary source of pressurized fluid 12, thereby increasing the speed at which the actuator 16a operates the control valve 16b in response to pneumatic signals generated by the positioner 18.

The output port 40b of the second volume booster 100b is connected in fluid communication with the second control port 36 of the actuator 16a via fluid line L8. The supply port 38b of the second volume booster 100b is connected in fluid communication with the primary source of pressurized fluid 12 via fluid lines L9 and L10 and connected in fluid communication with the secondary source of pressurized fluid 14 via fluid line L9, alone. The control signal port 42b of the second volume booster 100b is connected to the positioner 18 via fluid line L5, the trip valve 20, and fluid line L4. So configured, during the normal operating mode, the second volume booster 100b is adapted to boost, i.e., increase, the volume of pressurized fluid delivered to the second control port 36 of the actuator 16a from the primary source of pressurized fluid 12, thereby increasing the speed at which the actuator 16a moves operates the control valve 16b in response to pneumatic signals generated by the positioner 18. Moreover, during a trip mode, the second volume booster 100b is adapted to boost, i.e., increase, the volume of pressurized fluid delivered to the second control port 36 of the actuator 16a and the first volume booster 100a is adapted to boost, i.e., increase, the volume of pressurized fluid vented from the first control port 34 of the actuator 16a, as will be discussed in more detail below.

Still referring to FIG. 1, the positioner 18, which can be a digital valve controller (DVC), for example, includes an instrument supply port 44, a first outlet port 46, and a second outlet port 48. The instrument supply port 44 of the positioner 18 is connected in fluid communication with the primary source of pressurized fluid 12 via fluid line L1. The first outlet port 46 of the positioner 18 is connected in fluid communication with the control signal port 42a of the first volume booster 100a, during normal operation, via the trip valve 20 and fluid lines L3 and L6. The second outlet port 48 of the positioner 18 is connected to the control signal port 42b of the second volume booster 100b, during normal operation, via the trip valve 20 and fluid lines L4 and L5.

The trip valve 20 includes a supply inlet port 50, a first positioner inlet port 52 (the "A" port in FIG. 1), a second positioner inlet port 54 (the "D" port in FIG. 1), a first booster outlet port 56 (the "B" port in FIG. 1), a second booster outlet port 58 (the "E" port in FIG. 1), a tank supply port 60 (the "F" port in FIG. 1), and a vent port 62 (the "C" port in FIG. 1). In the disclosed embodiment, the trip valve 20 can include a 377 Series Trip Valve, which is commercially offered by Emerson Process Management. In the disclosed form, the system 10 is adapted such that the control valve assembly 15 occupies an "up" position during the trip mode, as will be discussed, and as such the trip valve 20 can include a Type 377U trip valve available from Emerson Process Management. In configurations where the control valve assembly 15 is desired to occupy a "down" position during the trip mode, the trip valve 20 may include a Type 377D trip valve available from Emerson Process Management.

Still referring to FIG. 1, the supply inlet port 50 of the trip valve 20 is connected in fluid communication with the primary source of pressurized fluid 12 via fluid lines L2 and L1. The first positioner inlet port 52 (port "A") of the trip valve 20 is connected in fluid communication with the first outlet port 46 of the positioner 18 via fluid line L3. The second positioner inlet port 54 (port "D") of the trip valve 20 is connected in fluid communication with the second outlet port 48 of the positioner 18 via fluid line L4. The first booster outlet port 56 (port "B") of the trip valve 20 is connected in fluid communication with the control signal port 42a of the first volume booster 100a via fluid line L6. The second booster outlet port 58 (port "E") of the trip valve 20 is connected in fluid communication with the control signal port 42b of the second volume booster 100b via fluid line L5. The tank supply port 60 (port "F") of the trip valve 20 is connected in fluid communication with the secondary source of pressurized fluid 14 via fluid line L11. The vent port 62 (port "C") of the trip valve 20 is simply open to atmosphere. With the various components of the system 10 connected, as shown in FIG. 1, the system 10 provides operational control in both a normal operating mode and a trip mode, as briefly mentioned.

During the normal operating mode, the check valve 26 is open and fluid from the primary source of pressurized fluid 12 is delivered along fluid line L1 to the positioner 18, along fluid lines L1 and L2 to the trip valve 20, and along fluid lines L9 and L10 to the first and second volume boosters 100a, 100b. The trip valve 20, via the supply inlet port 50, constantly monitors the pressure of fluid being supplied by the primary source of pressurized fluid 12. Assuming the pressure is equal to or above some preset threshold operating pressure, the trip valve 20 connects the first positioner inlet port 52 (port "A") to the first booster outlet port 56 (port "B") and the second positioner inlet port 54 (port "D") to the second booster outlet port 58 (port "E"). So configured, pneumatic signals generated by the positioner 18 travel through the trip valve 20 and to the control signal ports 42a, 42b of the boosters 100a, 100b for normal operation. Specifically, a pneumatic signal can travel from the first outlet port 46 of the positioner 18 to the first positioner inlet port 52 (port "A") of the trip valve 20, through the trip valve 20 and out the first booster outlet port 56 (port "B"), to the control signal port 42a of the first volume booster 100a. Similarly, a pneumatic signal can travel from the second outlet port 48 of the positioner 18 to the second positioner inlet port 54 (port "D") of the trip valve 20, through the trip valve 20 and out the second booster outlet port 58 (port "E"), and to the control signal port 42b of the second volume booster 100b. In this condition, the trip valve 20 is a passive device and does not affect the operation of the system 10.

In the event the pressure of the primary source of pressurized fluid 12 falls below the threshold pressure, this decrease is sensed by both the trip valve 20 and the check valve 26. Upon sensing the decrease, the check valve 26 automatically closes and cuts off the supply of fluid from the primary source of pressurized fluid 12 to the volume boosters 100a, 100b. Upon the trip valve 20 sensing the decreased pressure, a diaphragm (not shown) of the trip valve 20, which is in communication with the supply inlet port 50, actuates the trip valve 20 in a manner that switches the system 10 into the trip mode. During the trip mode, the trip valve 20 actuates to effectively divorce (e.g., separate, divide, sever, cut-off) the positioner 18 from the volume boosters 100a, 100b, and instead connect the secondary source of pressurized fluid 14 to the second volume booster 100b via control signal port 42b and simultaneously vent the first volume booster 100a via control signal port 42a. With the presently disclosed version of the trip valve 20, this is achieved my moving a pair of poppet valves (not shown) to disconnect the first and second positioner inlet ports 52 (port "A"), 54 (port "D") from the first and second booster outlet ports 56 (port "B"), 58 (port "E"). As such, the positioner 18 is effectively disconnected from the boosters 100a, 100b. Simultaneously, the trip valve 20 fluidly connects the first booster outlet port 56 (port "B") to the vent port 62 (port "C") and the second booster outlet port 58 (port "E") to the tank supply port 60 (port "F").

Thus, during the trip mode, pressurized fluid travels from the secondary source of pressurized fluid 14 through fluid line L11 to the tank supply port 60 (port "F") of the trip valve 20, through the trip valve 20 to second booster outlet port 58 (port "E"), and through fluid line L5 to the control signal port 42b of the second volume booster 100b. Additionally, as illustrated, fluid from the secondary source of pressurized fluid 14 travels through fluid line L9 to the supply port 38b of the second volume booster 100b. Furthermore, fluid from the secondary source of pressurized fluid 14 travels through fluid lines L9 and L10 to the supply port 38a of the first volume booster 100a. The control signal port 42a of the first volume booster 100a, however, is not connected to a source of pressurized fluid, but rather, is vented through fluid line L6, which is connected to the first booster outlet port 56 (port "B") and the vent port 62 (port "C") of the trip valve 20, which exhausts to atmosphere.

With this configuration, the first and second volume boosters 100a, 100b of the system 10 cooperate to quickly move a valve plug (not shown) of the control valve 16b into its "up" position by delivering pressurized fluid to the second control port 36 of the actuator housing 32, and therefore to the second surface 30b of the piston 30. Simultaneously, the first control port 34 of the actuator 16a is vented to atmosphere. This ensures a positive pressure differential across the piston 30, which then forces the piston 30 and valve plug upward, relative to the orientation of the control valve assembly 15 depicted in FIG. 1. This configuration can be referred to as a "fail-up" configuration.

Figure 2:
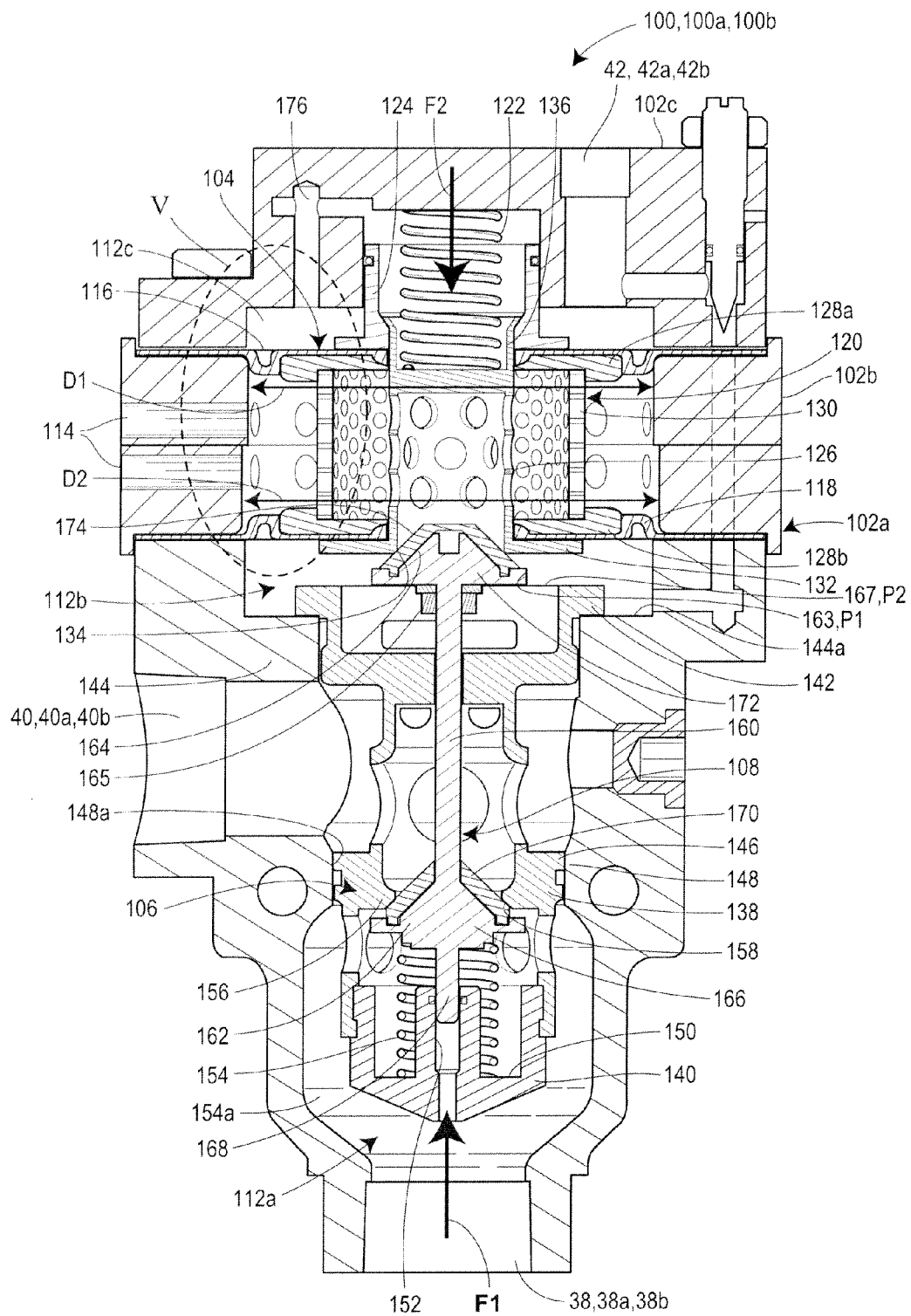
FIG. 2 is a cross-sectional side view of a volume booster of the fluid control system of FIG. 1 in a quiescent operational position.

With reference now to FIG. 2, the first and second volume boosters 100a, 100b will be described in more detail. The first and second volume boosters 100a, 100b of the system 10 depicted in FIG. 1 are identical, and therefore, FIG. 2 depicts a single volume booster 100 representative of each. The booster 100 includes a body 102a, a diaphragm housing 102b, a spring cap 102c, a diaphragm assembly 104, a trim cartridge 106, and a control element 108.

The body 102a defines the aforementioned supply port 38 and output port 40, and a supply cavity 112a. The diaphragm housing 102b defines a feedback cavity 112b and a plurality of exhaust vents 114 providing fluid communication between the feedback cavity 112b and the surrounding atmosphere. The spring cap 102c defines a signal cavity 112c. Furthermore, a supply path of the volume booster 100 is defined as extending between the supply port 38 and the output port 40, and an exhaust path of the volume booster 100 is defined as extending between the output port 40 and the plurality of exhaust vents 114.

The diaphragm assembly 104 is disposed between the feedback cavity 112b and the signal cavity 112c and includes an instrument diaphragm 116, a feedback diaphragm 118, a spacer 120, an exhaust spring 122, a sealing collar 124, and an exhaust column 126. The spacer 120 is disposed between the instrument and feedback diaphragms 116, 118 and includes opposing first and second spacer plates 128a, 128b having substantially similar diameters and a perforated collar 130. The first spacer plate 128a is disposed immediately below and in engagement with the instrument diaphragm 116, and the second spacer plate 128b is disposed immediately above and in engagement with the feedback diaphragm 118. The perforated collar 130 is disposed between the first and second spacer plates 128a, 128b and sets a distance therebetween. The exhaust column 126 includes a hollow perforated cylinder extending through openings in the instrument and feedback diaphragms 116, 118 and the spacer 120. An end of the exhaust column 126 adjacent to the feedback diaphragm 118 includes a disk shaped flange portion 132 that engages the feedback diaphragm 118 directly opposite the second spacer plate 128b of the spacer 120. The flange portion 132 includes an exhaust port 134 defining an opening. The opening can be any size such as approximately 0.75 inches in diameter, for example. An end of the exhaust column 126 adjacent the instrument diaphragm 116 terminates in a cup-shaped cylinder 136, which serves as a spring seat for the exhaust spring 122. As such, the exhaust spring 122 is disposed between the spring cap 102c of the volume booster 100 and the diaphragm assembly 104 and urges the diaphragm assembly 104 downward toward the control element 108, relative to the orientation of the volume booster 100 depicted in FIG. 2. In one version of the volume booster 100, the exhaust spring 122 includes a spring force in the range of approximately 8.01 lbs. to approximately 10.84 lbs., and preferably approximately 9.43 lbs.

Figure 5:
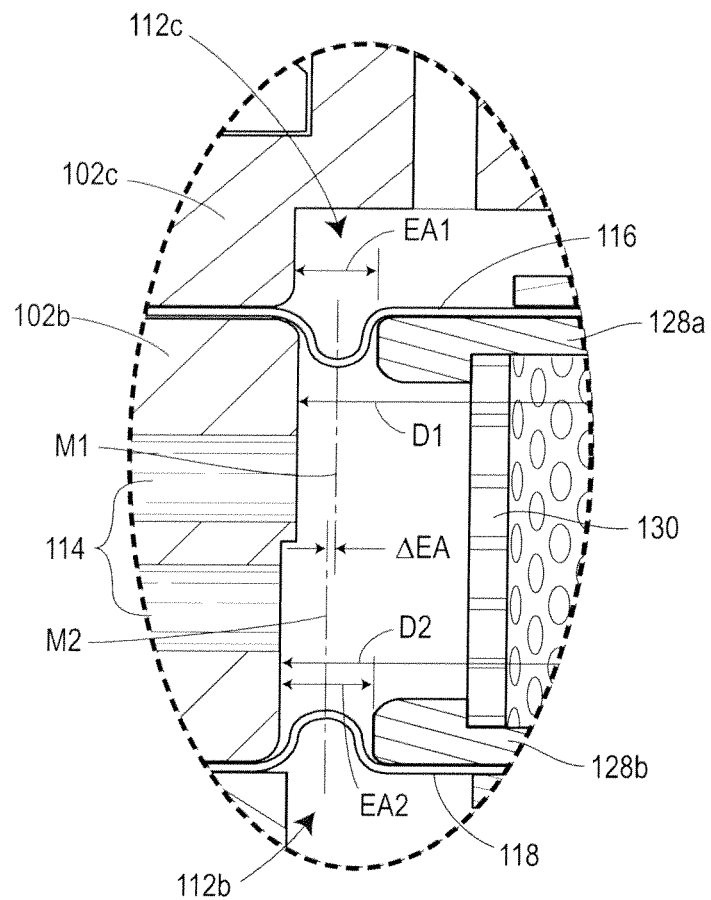
FIG. 5 is a detailed view of the volume booster of the present disclosure taken from circle III of FIG. 2.

In the detailed cross-section of the volume booster 100 shown in FIG. 5, it can be seen that a cavity defined within the diaphragm housing 102b includes separate and distinct first and second cross-sectional dimensions D1 and D2. It is generally understood that the force generated by a diaphragm is determined by the effective pressure area of the diaphragm. That is, in a diaphragm actuated device, such as the volume booster 100, the effective area is that part of the diaphragm area that is effective in producing a force. Further, the effective pressure area of the diaphragm disposed between (e.g., extending between, spanning between, etc.) two concentric cylinders may be generally defined by a diameter half-way between an outer cylinder and an inner cylinder.

More particularly, in the present volume booster 100, it should be understood that a first Effective Area EA1 is defined by a first midpoint M1 of the signal diaphragm 116 that is further defined by the first cross-sectional dimension D1 of the diaphragm housing 102b and the outer dimension of the first spacer plate 128a. A second Effective Area EA2 is defined by a second midpoint M2 of the feedback diaphragm 118 that is further defined the second cross-sectional dimension D2 of the diaphragm housing 102b and the outer dimension of the second spacer plate 128b. The second Effective Area EA2 is greater than the first Effective Area EA1 by a differential Effective Area defined by ΔEA shown in FIG. 5. It should be further appreciated that the same effective areas could be created by having D1 and D2 substantially similar and modifying the dimensions or diameters of the first and second spacer plates 128a and 128b. In one version of the volume booster 100, the first Effective Area EA1 may be in a range of approximately 6.127 in$^2$ to approximately 6.188 in$^2$, and preferably approximately 6.158 in$^2$ and the second Effective Area EA2 may be in a range of approximately 6.317 in$^2$ to approximately 6.379 in$^2$, and preferably approximately 6.348 in$^2$. These ranges of dimensions are merely examples, and other dimensions are intended to be included within the scope of the present disclosure.

In any event, the disclosed configuration of the feedback cavity 112b results in the feedback diaphragm 118 having the second Effective Area EA2 that is greater than the first Effective Area EA1 of the instrument diaphragm 116. The differential effective area creates a preferred force bias or seat load that is explained in detail below. Additionally, this difference in the first and second Effective Areas EA1 and EA2 at least partially compensates for the fact that the feedback diaphragm 118 includes an opening adjacent to the exhaust port 134, whereby fluid pressure in the feedback cavity 112b below the feedback diaphragm 118 does not act on the diaphragm assembly 104. Further, the instrument diaphragm 116 also includes an opening, through which the exhaust column 126 extends, the fluid pressure in the signal cavity 112c above the instrument diaphragm 116 also acts on the cup-shaped cylinder 136 via an auxiliary flow path 176 defined in the spring cap 102c. As such, the fluid pressure above the instrument diaphragm 116 acts on the first Effective Area EA1 and the fluid pressure below the feedback diaphragm 118 acts on the second Effective Area EA2.

Referring back to FIG. 2, the trim cartridge 106 of the volume booster 100 is supported within the body 102a and includes a body portion 138 and an end cap 140 fixed to a bottom end of the body portion 138. The body portion 138 includes an upper flange 142 seated against a shoulder 144a of a first radial web 144 of the body 102a to restrict movement of the trim cartridge 106 relative to the body 102a. Additionally, the body portion 138 includes a lower flange 146 seated against an internal surface 148a of a second radial web 148 of the body 102a to restrict lateral movement of the trim cartridge 106. Furthermore, the body portion 138 defines an internal radial web 156 including a cartridge supply port 158 defining an opening. The end cap 140 of the trim cartridge 106, as mentioned, is fastened to the bottom end of the body portion 138 opposite the upper flange 142 and defines a spring seat 150 and a central bore 152. A supply spring 154 of the volume booster 100 is seated on the spring seat 150 of the end cap 140 and in contact with the control element 108 to urge the control element 108 toward the cartridge supply port 158 of the trim cartridge 106 carried by the body 102a. In one version of the volume booster 100, the supply spring 154 includes a spring force in a range of approximately 11.43 lbs. to approximately 15.47 lbs., and preferably approximately 13.45 lbs. Thus, the supply spring 154 of the disclosed volume booster 100 can have a spring force that is greater than the spring force of the exhaust spring 122 discussed above. In the depicted version of the volume booster 100, the trim cartridge 106 is described as being a separate component from the body 102a, but in alternative versions of FIG. 2, the trim cartridge 106 and body 102a, or portions of the trim cartridge 106 and the body 102a, could be the same component.

The control element 108 of the volume booster 100 depicted in FIG. 2 includes a stem 160, a supply plug 162, and an exhaust plug 164. The stem 160 rigidly connects the supply and exhaust plugs 162, 164. More particularly, the stem 160 connects to the exhaust plug 164 via a threaded connection and a fastener 165 which may be a threaded fastener such as a nut. The supply plug 162 includes a seating body 166 and a stabilizer pin 168. The stabilizer pin 168 is slidably disposed in the central bore 152 of the end cap 140 of the trim cartridge 106 to assist with maintaining the axial alignment of the control element 108. The seating body 166, as shown, is a generally solid conical structure carried by the stem 160 of the control element 108. In the disclosed version, the supply plug 162 further includes an elastomeric supply component 170 associated therewith. The elastomeric supply component 170 can include, for example, an elastomeric material such as Nitrile, FKM, Ethylene Propylene, or Fluorosilicone, arranged in a conical configuration and sitting on the supply plug 162, between the supply plug 162 and the cartridge supply port 158, as shown. Similar to the supply plug 162, the exhaust plug 164 also includes a seating body 172 that is generally a solid conical structure fixed to an end of the stem 160 opposite the supply plug 162. Moreover, the exhaust plug 164 includes an elastomeric exhaust component 174. Similar to the elastomeric supply component 170, the elastomeric exhaust component 174 can include, for example, an elastomeric material arranged such as Nitrile, FKM, Ethylene Propylene, or Fluorosilicone, arranged in a conical configuration and sitting on the exhaust plug 164, between the exhaust plug 164 and the exhaust port 134, as shown.

While the elastomeric supply and exhaust components 170, 174 are depicted as being attached to the supply and exhaust plugs 162, 164, respectively, in other versions of the booster 100, they could be connected to the supply and exhaust ports 158, 134, respectively, or they may be floating components, for example. In any event, these elastomeric components 170, 174 advantageously assist with providing a fluid tight seal between the cartridge supply port 158 and the supply plug 162 and the exhaust port 134 and the exhaust plug 164 during operation, by providing a resilient seating surface between the respective components. Nevertheless, other versions of the volume booster 100 do not require or include either or both of the elastomeric components 170, 174. It should be further appreciated as depicted in FIG. 2 that upon assembly of the control element 108 in the trim cartridge 106, the exhaust plug 164 is rotated about the threaded connection on the stem 160 to place a first plane P1 defined by a lower planar surface 163 of the exhaust plug 164 in alignment with a second plane P2 defined by an upper planar surface 167 of the upper flange 142 of the trim cartridge 106. As shown, the lower planar surface 163 is disposed at an interface between the exhaust plug 164 and the stem 160 of the control element 108. As such, in the disclosed configuration, the lower planar surface 163 of the exhaust plug 164 and the upper planar surface 167 of the trim cartridge 167 are disposed in a common plane (i.e., they are co-planar) upon assembly and occupy a quiescent position, as will be described more fully below. This planar alignment is fixed by the application of the threaded fastener 165 into engagement with the exhaust plug 164, but in alternative versions, the exhaust plug 164 and the stem 160 can be fixed components.

Figure 3:
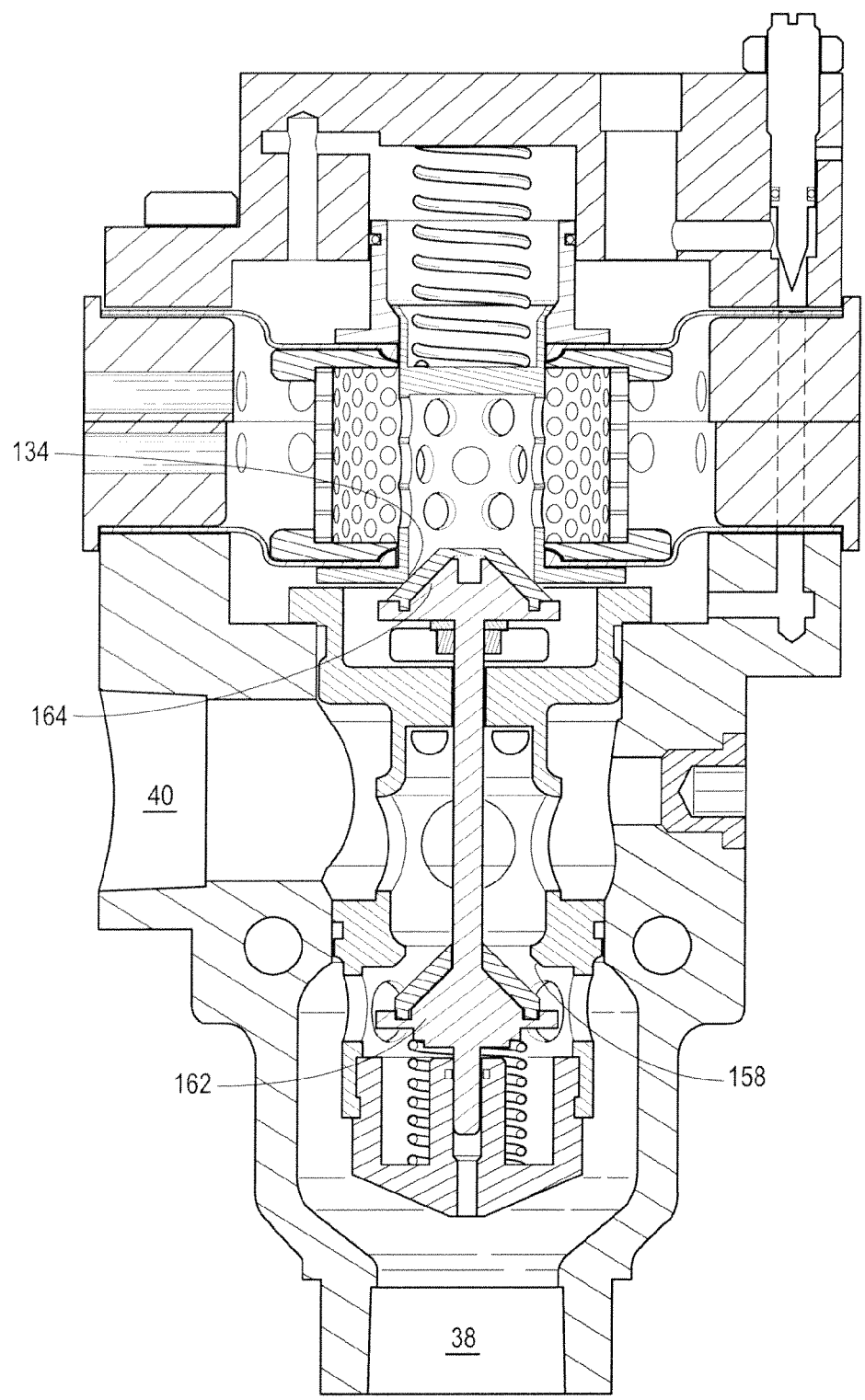
FIG. 3 is a cross-sectional side view of a volume booster of the fluid control system of FIG. 1 in a supply operational position.
Figure 4:
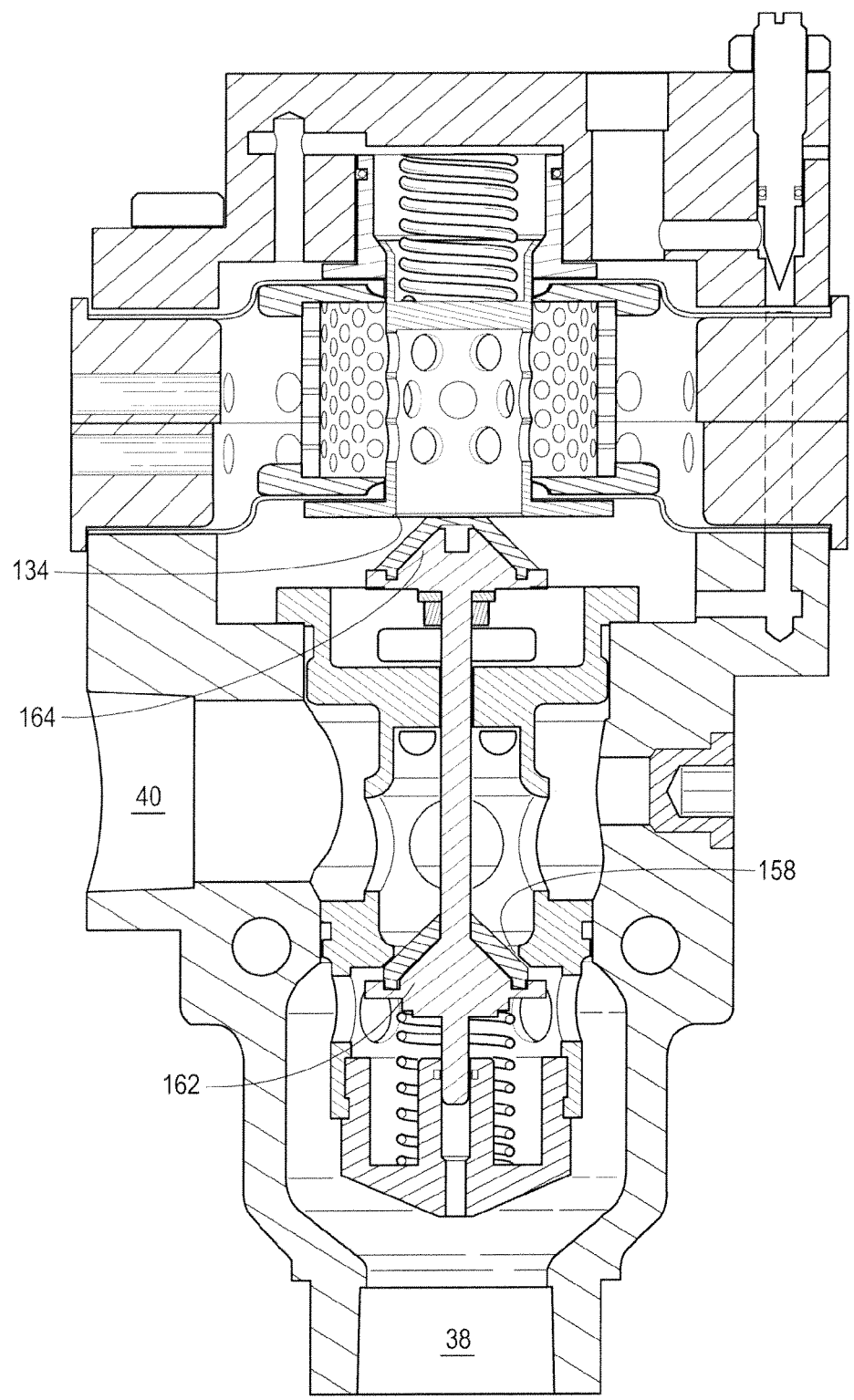
FIG. 4 is a cross-sectional side view of a volume booster of the fluid control system of FIG. 1 in an exhaust operational position.

With the volume booster 100 configured as described, the control element 108 and diaphragm assembly 104 are adapted for displacement between a (1) quiescent position (shown in FIG. 2), (2) a supply position (shown in FIG. 3) and (3) a vent or exhaust position (shown in FIG. 4). In (1) the quiescent position, the supply plug 162 of the control element 108 is in sealing engagement with the cartridge supply port 158 and the exhaust plug 164 of the control element 108 is in sealing engagement with the exhaust port 134 defined by the exhaust column 126 of the diaphragm assembly. In the (2) supply position, the supply plug 162 of the control element 108 is moved into a location that is spaced from the cartridge supply port 158 to open the supply path while the exhaust plug 164 maintains sealing engagement to the exhaust port 134. In (3) the vent position, the supply plug 162 of the control element 108 moves into sealing engagement with the supply port 158 to close the supply path and the diaphragm assembly 104 moves to a location spaced away from the exhaust plug 164, thereby opening the exhaust path.

As mentioned, FIG. 2 depicts the quiescent position for the control element 108 and diaphragm assembly 104, whereby the supply plug 162 is urged into sealing engagement with the cartridge supply port 158 to close the supply path, and the exhaust port 134 is urged into sealing engagement with the exhaust plug 164 to close the exhaust path. The supply plug 162 of the control element 108 is urged into engagement with the cartridge supply port 158 by a supply port seat load F1 and the exhaust port 134 is urged into engagement with the exhaust plug 164 by an exhaust port seat load F2. The supply port seat load F1 is the force generated by the supply spring 154 plus the force generated by the differential pressure across the supply port 38 minus the exhaust port seat load F2. The exhaust port seat load F2 constitutes the force generated by the exhaust spring 122 plus the pressure at the control signal port 42 (i.e., in the control cavity 112 above the instrument diaphragm 116 multiplied by the first Effective Area EA1 minus the pressure in the feedback cavity 112b multiplied by the second Effective Area EA2).

During normal operation of the system 10, as described above with reference to FIG. 1, fluid is supplied to the positioner 18 and volume boosters 100a, 100b from the primary source of pressurized fluid 12. At any given time, to adjust the position of the valve plug (not shown) of the control valve 16b, the positioner 18 sends pneumatic signals to the inlet connections 42a, 42b of the volume boosters 100a, 100b, which then act to deliver fluid to the actuator 16a via the corresponding output ports 40a, 40b. Accordingly, at any given time, the control elements 108 and diaphragm assemblies 104 of the first and second volume boosters 100a, 100b depicted in FIG. 1 may occupy any one of the quiescent, supply, or vent positions.

However, during the trip mode, when the trip valve 20 of FIG. 1 replaces the primary supply of pressurized fluid 12 with the secondary source of pressurized fluid 14, as discussed above, the first volume booster 100a quickly moves into an exhaust or vent condition, whereby the cartridge supply port 158 closes and the exhaust port 134 opens. In this temporary condition, the fluid disposed above the piston 30 in the housing 32 of the actuator 16a promptly exits the second control port 34, travels through fluid line L7, into the output port 40a of the first volume booster 100a, through the open exhaust port 134 and spacer 120 of the diaphragm assembly 104, and out the plurality of exhaust vents 114 to the surrounding atmosphere. The speed at which the diaphragm assembly 104 and exhaust port 134 move to the vent position is facilitated by the fact that the control signal port 42a of the first volume booster 100a is vented directly to the surrounding atmosphere via fluid line L6 and the first booster outlet port 56 (port "B") and vent port 62 (port "C") of the trip valve 20.

Simultaneously with the foregoing, the second volume booster 100b also operates to promptly fill the housing 32 of the actuator 16a below the piston 30 in order to force the valve plug up. To facilitate this operation, the fluid from the secondary source of pressurized fluid 14 is supplied to the supply port 38b (via fluid lines L9) and control signal port 42b (via fluid line L11, the trip valve 20, and fluid line L5) of the second volume booster 100b such that the diaphragm assembly 104 urges the exhaust port 134 downward against the exhaust plug 164. This urging also moves the entire control element 108 downward and unseats the supply plug 162 from the cartridge supply port 158. In this temporary condition, the exhaust path is closed and the supply path is open such that fluid from the secondary source of pressurized fluid 14 travels to the supply port 38b of the second volume booster 100b, through the cartridge supply port 158, and out the output port 40b to the second control port 36 of the actuator 16a.

As mentioned, the exhaust port 134 of the first volume booster 100a and the cartridge supply port 158 of the second volume booster 100b of the system 10 of FIG. 1 are only open during the trip mode for a short period of time, e.g., until the control element 28 of the control valve 16b is moved into its desired position. Once the control element 28 of the control valve 16b reaches its desired position, the first and second volume boosters 100a, 100b each return to the closed condition depicted in FIG. 2. That is, the supply 158 and exhaust ports 134 of each of the first and second volume boosters 100a, 100b ultimately end up being closed during the trip mode.

In this closed condition of the trip mode, it is important that no fluid leaks through the exhaust port 134 of the first volume booster 100a or through the cartridge supply port 158 of the second volume booster 100b. Leakage can cause the secondary source of pressurized fluid 14, which in the disclosed embodiment includes a volume tank, to bleed down, thereby losing pressure, and valve position integrity during subsequent trip mode operations. The volume booster 100 of the present disclosure is therefore designed and configured in a manner to ensure that the supply port seat load F1 of the first volume booster 100a and the exhaust port seat load F2 of the second volume booster 100b are maximized during the trip mode.

Figure 6:
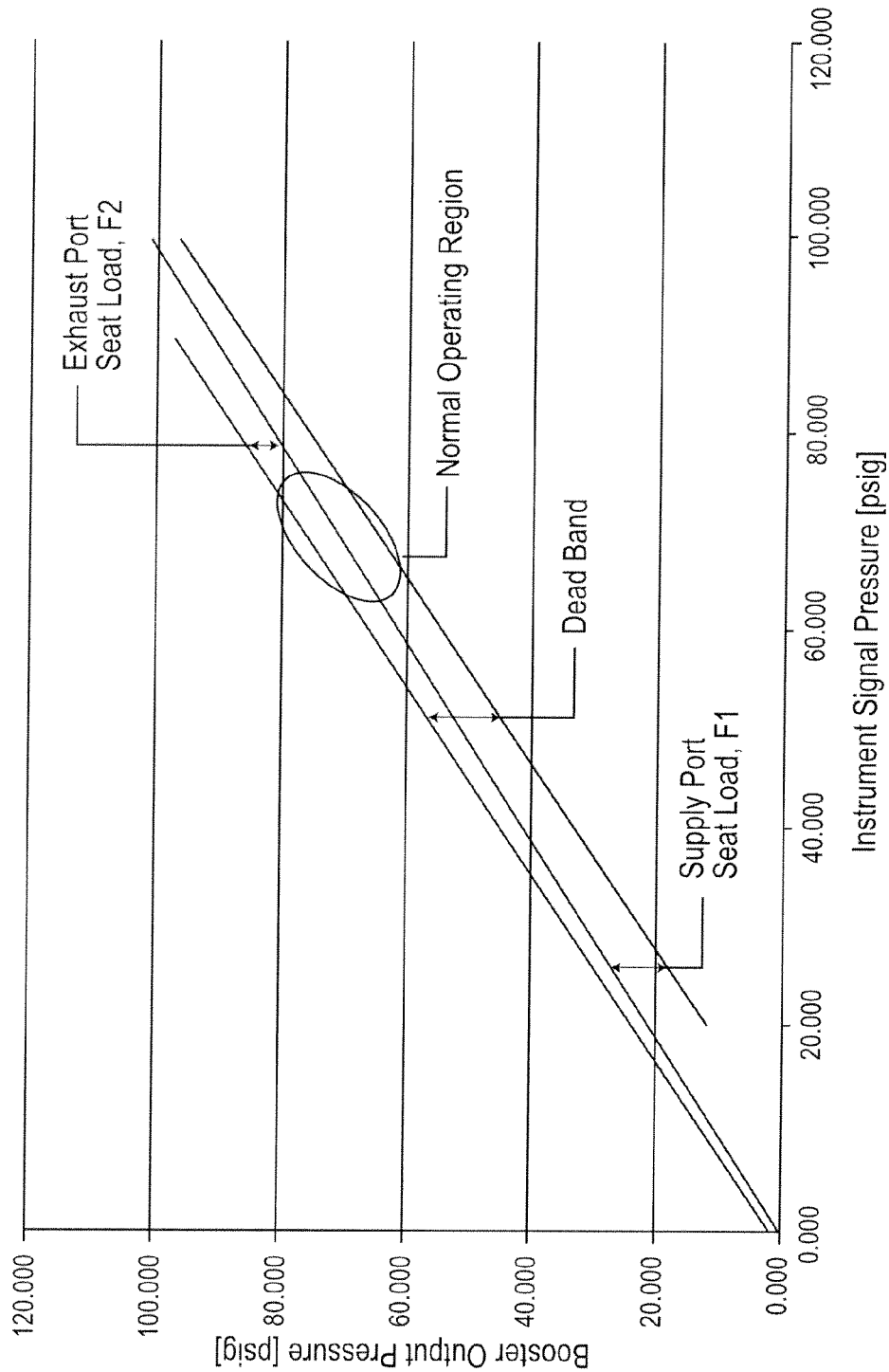
FIG. 6 is a graphical characterization of the performance of the volume booster depicted in FIG. 2.

This can be characterized by the graph illustrated in FIG. 6. The horizontal axis of FIG. 6 represents the pressure at the control signal port 42 of each volume booster 100 and the vertical axis represents the pressure at the output port 40 of each volume booster 100. The graph includes three lines. The center line is a reference line that generally tracks a 1:1 progression between inlet connection pressure and output pressure. The bottom line characterizes the volume booster 100 during operation as the pressure at the control signal port 42 is increased from approximately 20 psig to approximately 100 psig. The top line characterizes the volume booster 100 during operation as the pressure at the control signal port 42 is decreased from approximately 100 psig to approximately 0 psig. The difference between the bottom line and the middle line is the supply port seat load F1. The difference between the top line and the middle line is the exhaust port seat load F2. The difference between the top line and the bottom line is what is referred to as the "dead band" of the volume booster 100, which can be considered to represent the required change in pressure at the control signal port 42 to unseat the booster. The greater the dead band, the larger the required change in pressure.

Based on this data, the upper right-hand quadrant of the graph in FIG. 6 characterizes the second volume booster 100b of the system 10 of FIG. 1 during the trip mode, and the lower left-hand quadrant of the graph characterizes the first volume booster 100a during the trip mode. The normal operating modes of the first and second volume boosters 100a, 100b can generally be characterized by the circled region between approximately 60 psig and approximately 80 psig.

As can be seen, the bottom line in the graph of FIG. 6 is skewed relative the middle reference line such that the supply port seat load F1 of the volume booster 100 is maximized in the lower left-hand quadrant (i.e., at low output port pressures), and minimized in the upper right-hand quadrant (i.e., at high output port pressures). Moreover, the top line is skewed such that the exhaust port seat load F2 is maximized in the upper right-hand quadrant (i.e., at high output port pressures) and minimized in the lower left-hand quadrant (i.e., at low output port pressures). Further still, in the normal operating region, the supply port seat load and the exhaust port seat load are approximately equal. Thus, it can be said that the exhaust port seat load F2 of the presently disclosed volume booster 100 varies in proportion to the output pressure, and the supply port seat load F1 of the presently disclosed volume booster 100 varies in inverse proportion to the output pressure. So configured, the volume booster 100 effectively maximizes the appropriate seat load in the desired operational conditions, thereby minimizing and/or preventing leakage of fluid from the secondary source of pressurized fluid during the trip mode described herein while also minimizing the dead band (i.e. the change in pressure required to respond to an input signal) of the volume booster 100.

While the foregoing description provides various examples and versions of the present invention, the present disclosure is not intended to be limited to the specific examples or versions. Rather, the invention is intended to be defined by the spirit and scope of the following claims and all equivalents thereof. Moreover, the present invention is intended to include all subject matter encompassed by the following aspects:

Aspect 1. A fluid flow control device, comprising a supply port for receiving a supply of pressurized fluid; an output port for delivering a supply of pressurized fluid; a vent port for venting a supply of pressurized fluid; a trim cartridge disposed between the supply port and the output port and between the output port and the vent port, the trim cartridge defining a cartridge supply port and an upper planar surface, the cartridge supply port being disposed along a supply path extending between the supply port and the output port, the upper planar surface disposed along an exhaust path extending between the output port and the vent port; a diaphragm assembly disposed between the output port and the vent port, the diaphragm assembly defining an exhaust port along the exhaust path; a control element movably disposed in the trim cartridge, the control element including a supply plug, an exhaust plug, and a stem extending between the supply and exhaust plugs, the supply plug in selective engagement with the cartridge supply port of the trim cartridge, thereby closing the supply path, the exhaust plug in selective engagement with the exhaust port of the diaphragm assembly, thereby closing the exhaust path, the exhaust plug comprising a lower planar surface disposed at an interface between the exhaust plug and the stem, the lower planar surface of the exhaust plug being coplanar with the upper planar surface of the trim cartridge.

Aspect 2. The device of aspect 1, further comprising: an elastomeric supply component disposed between the supply plug of the control element and the cartridge supply port for providing a fluid tight seal; and an elastomeric exhaust component disposed between the exhaust plug of the control element and the exhaust port of the diaphragm assembly for providing a fluid tight seal.

Aspect 3. The device of any one of the preceding aspects, wherein the elastomeric supply component is fixed to the supply plug of the control element and the elastomeric exhaust component is fixed to the exhaust plug of the control element.

Aspect 4. The device of any one of the preceding aspects, further comprising: a body defining the supply port and the output port; a diaphragm housing defining the vent port and containing the diaphragm assembly; and a spring cap defining a control signal port.

Aspect 5. The device of any one of the preceding claims, further comprising a supply spring supported by the trim cartridge and engaging the control element for biasing the control element toward the cartridge supply port, and an exhaust spring disposed between the spring cap and the diaphragm assembly for biasing the exhaust port toward the control element.

Aspect 6. The device of any one of the preceding aspects, wherein the diaphragm assembly comprises an instrument diaphragm, a feedback diaphragm, and a perforated spacer disposed between the instrument and feedback diaphragms, the feedback diaphragm in communication with the output port of the body and the instrument diaphragm in communication with the control signal port of the spring cap.

Aspect 7. The device of any one of the preceding aspects, wherein the diaphragm housing includes a feedback cavity, in which the diaphragm assembly is movably disposed, the feedback cavity having a first cross-sectional dimension adjacent to the instrument diaphragm and a second cross-sectional dimension adjacent the feedback diaphragm, the second cross-sectional dimension greater than the first cross-sectional dimension.

Aspect 8. A fluid flow control device, comprising: a body defining a supply port adapted to be coupled to at least one supply of pressurized air and an output port adapted to be coupled to an actuator of a control valve; a diaphragm housing coupled to the body and defining a vent port adapted to be in communication with a surrounding atmosphere; a spring cap coupled to the diaphragm housing and defining a control signal port adapted to receive a pneumatic control signal; a supply path extending between the supply and output ports of the body; an exhaust path extending between the output port of the body and the vent port of the diaphragm housing; a trim cartridge disposed within the body and defining a cartridge supply port and an upper planar surface, the cartridge supply port being disposed along the supply path between the supply and output ports of the body, the upper planar surface disposed along the exhaust path between the output port of the body and the vent port of the diaphragm housing; a diaphragm assembly disposed within the diaphragm housing and defining an exhaust port disposed along the exhaust path between the output port of the body and the vent port of the diaphragm housing; and a control element disposed within the body and including a supply plug, an exhaust plug, and a stem extending between the supply and exhaust plugs, the exhaust plug comprising a lower planar surface at an interface between the exhaust plug and the stem, the control element and the diaphragm assembly movable in the body and the diaphragm housing, respectively, relative to a quiescent position, wherein a supply port seat load urges the supply plug into engagement with the cartridge supply port and an exhaust port seat load simultaneously urges the exhaust port of the diaphragm assembly into engagement with the exhaust plug of the control element to close the exhaust path, wherein the upper planar surface of the trim cartridge is aligned with the lower planar surface of the exhaust plug when the control element and the diaphragm assembly occupy the quiescent position.

Aspect 9. The device of aspect 8, wherein the control element and the diaphragm assembly are movable from the quiescent position to a supply position and a vent position, wherein when in the supply position, the exhaust port seat load urges the exhaust port into engagement with the exhaust plug and the supply plug into a position spaced from the cartridge supply port, and when in the vent position, the supply port seat load urges the supply plug into engagement with the cartridge supply port and an output pressure in the output port of the body overcomes the exhaust port seat load and urges the exhaust port into a position spaced away from the exhaust plug.

Aspect 10. The device of any one of aspects 8 to 9, further comprising: an elastomeric supply component disposed between the supply plug of the control element and the cartridge supply port of the trim cartridge for providing a fluid tight seal when in the quiescent and vent positions; and an elastomeric exhaust component disposed between the exhaust plug of the control element and the exhaust port of the diaphragm assembly for providing a fluid tight seal when in the quiescent and supply positions.

Aspect 11. The device of any one of aspects 8 to 10, wherein the elastomeric supply component is fixed to the supply plug of the control element and the elastomeric exhaust component is fixed to the exhaust plug of the control element.

Aspect 12. The device of any one of aspects 8 to 11, wherein a magnitude of the exhaust port seat load varies in proportion to an output pressure present in the output port and a magnitude of the supply port seat load varies in inverse proportion to the output pressure.

Aspect 13. The device of any one of aspects 8 to 12, further comprising a supply spring supported by the trim cartridge and engaging the control element for biasing the control element toward the cartridge supply port, and an exhaust spring disposed between the spring cap and the diaphragm assembly for biasing the exhaust port toward the control element.

Aspect 14. The device of any one of aspects 8 to 13, wherein the diaphragm assembly comprises an instrument diaphragm, a feedback diaphragm, and a perforated spacer disposed between the instrument and feedback diaphragms, the feedback diaphragm in communication with the output port of the body and the instrument diaphragm in communication with the control signal port of the spring cap.

Aspect 15. The device of any one of aspects 8 to 14, wherein the diaphragm housing includes a feedback cavity, in which the diaphragm assembly is movably disposed, the feedback cavity having a first cross-sectional dimension adjacent to the instrument diaphragm and a second cross-sectional dimension adjacent the feedback diaphragm, the second cross-sectional dimension greater than the first cross-sectional dimension.

Aspect 16. A fluid process control system, comprising: a control valve;

an actuator operably connected to the control valve, the actuator including a piston, a first control port in fluid communication with a first surface of the piston, and a second control port in fluid communication with a second surface of the piston; a primary source of pressurized fluid for actuating the actuator during a normal operating mode; a secondary source of pressurized fluid for actuating the actuator during a trip mode; a first volume booster connected in fluid communication with the first control port of the actuator and the primary source of pressurized fluid, the first volume booster adapted to boost a volume of pressurized fluid delivered to the first control port from the primary source of pressurized fluid during the normal operating mode; a second volume booster connected in fluid communication with the second control port of the actuator, the primary source of pressurized fluid, and the secondary source of pressurized fluid, the second volume booster adapted to boost the volume of pressurized fluid delivered to the second control port from the primary source of pressurized fluid during the normal operating mode and the secondary source of pressurized fluid during the trip mode; and a positioner having an inlet port in fluid communication with the primary source of pressurized fluid, a first outlet port in fluid communication with an inlet connection of the first volume booster, and a second outlet port in fluid communication with an inlet connection of the second volume booster, the positioner adapted to deliver a pneumatic signal to the first and second volume boosters during the normal operating mode of the system for controlling the control valve; each of the first and second volume boosters comprising a supply port, an output port, a vent port, a trim cartridge, a diaphragm assembly, and a control element, the trim cartridge defining a cartridge supply port and an upper planar surface, the cartridge supply port being disposed along a supply path of the volume booster extending between the supply port and the output port, the upper planar surface disposed along an exhaust path of the volume booster extending between the output port and the vent port; the diaphragm assembly defining an exhaust port disposed along the exhaust path between the output port and the vent port, and the control element being movably disposed within the trim cartridge and including a supply plug for selectively engaging the cartridge supply port of the trim cartridge, an exhaust plug for selectively engaging the exhaust port of the diaphragm assembly, and a stem extending between the supply and exhaust plugs, the exhaust plug comprising a lower planar surface at an interface between the exhaust plug and the stem, the lower planar surface disposed in alignment with the upper planar surface of the trim cartridge when the supply plug and the exhaust plug simultaneously engage the cartridge supply port and the exhaust port, respectively.

Aspect 17. The system of aspect 16, wherein the control element and the diaphragm assembly are movable between a quiescent position, a supply position, and a vent position, wherein when in the quiescent position, a supply port seat load urges the supply plug into engagement with the cartridge supply port and an exhaust port seat load simultaneously urges the exhaust port into engagement with the exhaust plug, when in the supply position, the exhaust port seat load urges the exhaust port into engagement with the exhaust plug and the supply plug into a position spaced from the cartridge supply port, and when in the vent position, the supply port seat load urges the supply plug into engagement with the cartridge supply port and an output pressure in the output port of the volume booster overcomes the exhaust port seat load and urges the exhaust port into a location spaced away from the exhaust plug.

Aspect 18. The system of any one of aspects 16 to 17, wherein, during the trip mode, the control element and the diaphragm assembly occupy the vent position.

Aspect 19. The system of any one of aspects 16 to 18, wherein
the supply port seat load of the first volume booster during the trip mode is greater than the supply port seat load of the first volume booster during the normal operating mode, and the exhaust port seat load of the second volume booster during the trip mode is greater than the exhaust port seat load of the second volume booster during the normal operating mode.

Aspect 20. The system of any one of aspects 16 to 19, further comprising an elastomeric supply component associated with the supply plug, and an elastomeric exhaust component associated with the exhaust plug.

Aspect 21. The system of any one of aspects 16 to 20, wherein, for each of the first and second volume boosters, the supply port seat load and the exhaust port seat load is the same during the normal operating mode.

Aspect 22. The system of any one of aspects 16 to 21, wherein each of the first and second volume boosters further comprises: a body defining the supply port, the supply port being coupled to the primary and secondary sources of pressurized air, and the output port, the output port being coupled to one of the first and second control ports of the actuator; a diaphragm housing defining the vent port, the vent port being in communication with the atmosphere; a spring cap defining a control signal port coupled to one of the first and second fluid outlet ports of the positioner.

Aspect 23. The system of any one of aspects 16 to 22, wherein the diaphragm assembly of each of the first and second volume boosters comprises an instrument diaphragm, a feedback diaphragm, and a perforated spacer disposed between the instrument and feedback diaphragms, the feedback diaphragm in communication with the output port and the instrument diaphragm in communication with the control signal port.

Aspect 24. The system of any one of aspects 16 to 23, wherein the diaphragm housing of each of the first and second volume boosters includes a feedback cavity, in which the diaphragm assembly is movably disposed, the feedback cavity having a first cross-sectional dimension adjacent to the instrument diaphragm and a second cross-sectional dimension adjacent the feedback diaphragm, the second cross-sectional dimension greater than the first cross-sectional dimension.

Aspect 25. The system of any one of aspects 16 to 24, wherein a magnitude of the exhaust port seat load varies in proportion to an output pressure present in the output port and a magnitude of the supply port seat load varies in inverse proportion to the output pressure.

Aspect 26. The system of any one of aspects 16 to 25, wherein each of the first and second volume boosters further comprises a supply spring supported by the trim cartridge and engaging the control element for biasing the control element toward the cartridge supply port, and an exhaust spring disposed between the spring cap and the diaphragm assembly for biasing the exhaust port toward the control element.

I claim:
1. A fluid flow control device, comprising:
a supply port for receiving a supply of pressurized fluid;
an output port for delivering a supply of pressurized fluid;
a vent port for venting a supply of pressurized fluid;
a trim cartridge disposed between the supply port and the output port and between the output port and the vent port, the trim cartridge defining a cartridge supply port and an upper planar surface, the cartridge supply port being disposed along a supply path extending between the supply port and the output port, the upper planar surface disposed along an exhaust path extending between the output port, through the trim cartridge, and then the vent port;

a diaphragm assembly disposed between the output port and the vent port, the diaphragm assembly defining an exhaust port along the exhaust path;

a control element movably disposed in the trim cartridge, the control element including a supply plug, an exhaust plug, and a stem extending between the supply and exhaust plugs, the supply plug in selective engagement with the cartridge supply port of the cartridge, thereby closing the supply path, the exhaust plug in selective engagement with the exhaust port of the diaphragm assembly, thereby closing the exhaust path, the exhaust plug comprising a lower planar surface disposed at an interface between the exhaust plug and the stem, wherein during the selective engagement the lower planar surface of the exhaust plug being coplanar with the upper planar surface of the trim cartridge.

2. The device of claim 1, further comprising:

an elastomeric supply component disposed between the supply plug of the control element and the cartridge supply port for providing a fluid tight seal; and an elastomeric exhaust component disposed between the exhaust plug of the control element and the exhaust port of the diaphragm assembly for providing a fluid tight seal.

3. The device of claim 2, wherein the elastomeric supply component is fixed to the supply plug of the control element and the elastomeric exhaust component is fixed to the exhaust plug of the control element.

4. The device of claim 1, further comprising:

a body defining the supply port and the output port;

a diaphragm housing defining the vent port and containing the diaphragm assembly; and a spring cap defining a control signal port.

5. The device of claim 4, further comprising a supply spring supported by the trim cartridge and engaging the control element for biasing the control element toward the cartridge supply port, and an exhaust spring disposed between the spring cap and the diaphragm assembly for biasing the exhaust port toward the control element.

6. The device of claim 4, wherein the diaphragm assembly comprises an instrument diaphragm, a feedback diaphragm, and a perforated spacer disposed between the instrument and feedback diaphragms, the feedback diaphragm in communication with the output port of the body and the instrument diaphragm in communication with the control signal port of the spring cap.

7. The device of claim 4, wherein the diaphragm housing includes a feedback cavity, in which the diaphragm assembly is movably disposed, the feedback cavity having a first cross-sectional dimension adjacent to the instrument diaphragm and a second cross-sectional dimension adjacent the feedback diaphragm, the second cross-sectional dimension greater than the first cross-sectional dimension.

8. A fluid flow control device, comprising:

a body defining a supply port adapted to be coupled to at least one supply of pressurized air and an output port adapted to be coupled to an actuator of a control valve;

a diaphragm housing coupled to the body and defining a vent port adapted to be in communication with a surrounding atmosphere;

a spring cap coupled to the diaphragm housing and defining a control signal port adapted to receive a pneumatic control signal;

a supply path extending between the supply and output ports of the body;

an exhaust path extending between the output port of the body and the vent port of the diaphragm housing;

a trim cartridge disposed within the body and defining a cartridge supply port and an upper planar surface, the cartridge supply port being disposed along the supply path between the supply and output ports of the body, the upper planar surface disposed along the exhaust path between the output port of the body, through the trim cartridge, and then the vent port of the diaphragm housing;

a diaphragm assembly disposed within the diaphragm housing and defining an exhaust port disposed along the exhaust path between the output port of the body and the vent port of the diaphragm housing; and a control element disposed within the body and including a supply plug, an exhaust plug, and a stem extending between the supply and exhaust plugs, the exhaust plug comprising a lower planar surface at an interface between the exhaust plug and the stem, the control element and the diaphragm assembly movable in the body and the diaphragm housing, respectively, relative to a quiescent position, wherein a supply port seat load urges the supply plug into engagement with the cartridge supply port and an exhaust port seat load simultaneously urges the exhaust port of the diaphragm assembly into engagement with the exhaust plug of the control element to close the exhaust path, wherein the upper planar surface of the trim cartridge is aligned with the lower planar surface of the exhaust plug when the control element and the diaphragm assembly occupy the quiescent position.

9. The device of claim 8, wherein the control element and the diaphragm assembly are movable from the quiescent position to a supply position and a vent position, wherein when in the supply position, the exhaust port seat load urges the exhaust port into engagement with the exhaust plug and the supply plug into a position spaced from the cartridge supply port, and when in the vent position, the supply port seat load urges the supply plug into engagement with the cartridge supply port and an output pressure in the output port of the body overcomes the exhaust port seat load and urges the exhaust port into a position spaced away from the exhaust plug.

10. The device of claim 9, further comprising:

an elastomeric supply component disposed between the supply plug of the control element and the cartridge supply port of the trim cartridge for providing a fluid tight seal when in the quiescent and vent positions; and an elastomeric exhaust component disposed between the exhaust plug of the control element and the exhaust port of the diaphragm assembly for providing a fluid tight seal when in the quiescent and supply positions.

11. The device of claim 10, wherein the elastomeric supply component is fixed to the supply plug of the control element and the elastomeric exhaust component is fixed to the exhaust plug of the control element.

12. The device of claim 8, wherein a magnitude of the exhaust port seat load varies in proportion to an output pressure present in the output port and a magnitude of the supply port seat load varies in inverse proportion to the output pressure.

13. The device of claim 8, further comprising a supply spring supported by the trim cartridge and engaging the control element for biasing the control element toward the cartridge supply port, and an exhaust spring disposed between the spring cap and the diaphragm assembly for biasing the exhaust port toward the control element.

14. The device of claim 8, wherein the diaphragm assembly comprises an instrument diaphragm, a feedback diaphragm, and a perforated spacer disposed between the instrument and feedback diaphragms, the feedback diaphragm in communication with the output port of the body and the instrument diaphragm in communication with the control signal port of the spring cap.

15. The device of claim 8, wherein the diaphragm housing includes a feedback cavity, in which the diaphragm assembly is movably disposed, the feedback cavity having a first cross-sectional dimension adjacent to the instrument diaphragm and a second cross-sectional dimension adjacent the feedback diaphragm, the second cross-sectional dimension greater than the first cross-sectional dimension.

16. A fluid process control system, comprising:
a control valve;
an actuator operably connected to the control valve, the actuator including a piston, a first control port in fluid communication with a first surface of the piston, and a second control port in fluid communication with a second surface of the piston;
a primary source of pressurized fluid for actuating the actuator during a normal operating mode;
a secondary source of pressurized fluid for actuating the actuator during a trip mode;
a first volume booster connected in fluid communication with the first control port of the actuator and the primary source of pressurized fluid, the first volume booster adapted to boost a volume of pressurized fluid delivered to the first control port from the primary source of pressurized fluid during the normal operating mode;
a second volume booster connected in fluid communication with the second control port of the actuator, the primary source of pressurized fluid, and the secondary source of pressurized fluid, the second volume booster adapted to boost the volume of pressurized fluid delivered to the second control port from the primary source of pressurized fluid during the normal operating mode and the secondary source of pressurized fluid during the trip mode; and
a positioner having an inlet port in fluid communication with the primary source of pressurized fluid, a first outlet port in fluid communication with an inlet connection of the first volume booster, and a second outlet port in fluid communication with an inlet connection of the second volume booster, the positioner adapted to deliver a pneumatic signal to the first and second volume boosters during the normal operating mode of the system for controlling the control valve;
each of the first and second volume boosters comprising a supply port, an output port, a vent port, a trim cartridge, a diaphragm assembly, and a control element,
the trim cartridge defining a cartridge supply port and an upper planar surface, the cartridge supply port being disposed along a supply path of the volume booster extending between the supply port and the output port, the upper planar surface disposed along an exhaust path of the volume booster extending between the output port, through the trim cartridge, and then the vent port;
the diaphragm assembly defining an exhaust port disposed along the exhaust path between the output port and the vent port, and
the control element being movably disposed within the trim cartridge and including a supply plug for selectively engaging the cartridge supply port of the trim cartridge, an exhaust plug for selectively engaging the exhaust port of the diaphragm assembly, and a stem extending between the supply and exhaust plugs, the exhaust plug comprising a lower planar surface at an interface between the exhaust plug and the stem, the lower planar surface disposed in alignment with the upper planar surface of the trim cartridge when the supply plug and the exhaust plug simultaneously engage the cartridge supply port and the exhaust port, respectively.

17. The system of claim 16, wherein the control element and the diaphragm assembly are movable between a quiescent position, a supply position, and a vent position, wherein
when in the quiescent position, a supply port seat load urges the supply plug into engagement with the cartridge supply port and an exhaust port seat load simultaneously urges the exhaust port into engagement with the exhaust plug,
when in the supply position, the exhaust port seat load urges the exhaust port into engagement with the exhaust plug and the supply plug into a position spaced from the cartridge supply port, and
when in the vent position, the supply port seat load urges the supply plug into engagement with the cartridge supply port and an output pressure in the output port of the volume booster overcomes the exhaust port seat load and urges the exhaust port into a location spaced away from the exhaust plug.

18. The system of claim 17, wherein, during the trip mode, the control element and the diaphragm assembly occupy the vent position.

19. The system of claim 16, wherein
the supply port seat load of the first volume booster during the trip mode is greater than the supply port seat load of the first volume booster during the normal operating mode, and
the exhaust port seat load of the second volume booster during the trip mode is greater than the exhaust port seat load of the second volume booster during the normal operating mode.

20. The system of claim 16, further comprising an elastomeric supply component associated with the supply plug, and an elastomeric exhaust component associated with the exhaust plug.

21. The system of claim 16, wherein, for each of the first and second volume boosters, the supply port seat load and the exhaust port seat load is the same during the normal operating mode.

22. The system of claim 16, wherein each of the first and second volume boosters further comprises:
a body defining the supply port, the supply port being coupled to the primary and secondary sources of pressurized air, and the output port, the output port being coupled to one of the first and second control ports of the actuator;
a diaphragm housing defining the vent port, the vent port being in communication with the atmosphere;
a spring cap defining a control signal port coupled to one of the first and second fluid outlet ports of the positioner.

23. The system of claim 22, wherein the diaphragm assembly of each of the first and second volume boosters comprises an instrument diaphragm, a feedback diaphragm, and a perforated spacer disposed between the instrument and feedback diaphragms, the feedback diaphragm in communication with the output port and the instrument diaphragm in communication with the control signal port.

24. The system of claim 22, wherein the diaphragm housing of each of the first and second volume boosters includes a feedback cavity, in which the diaphragm assembly is movably disposed, the feedback cavity having a first cross-sectional dimension adjacent to the instrument diaphragm and a second cross-sectional dimension adjacent the feedback diaphragm, the second cross-sectional dimension greater than the first cross-sectional dimension.

25. The system of claim 16, wherein a magnitude of the exhaust port seat load varies in proportion to an output pressure present in the output port and a magnitude of the supply port seat load varies in inverse proportion to the output pressure.

26. The system of claim 22, wherein each of the first and second volume boosters further comprises a supply spring supported by the trim cartridge and engaging the control element for biasing the control element toward the cartridge supply port, and an exhaust spring disposed between the spring cap and the diaphragm assembly for biasing the exhaust port toward the control element.

* * * * *